(12) United States Patent
Daniels

(10) Patent No.: US 7,877,433 B2
(45) Date of Patent: Jan. 25, 2011

(54) INFRASTRUCTURE BY CONTRACT

(75) Inventor: Russell Daniels, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 600 days.

(21) Appl. No.: 11/581,828

(22) Filed: Oct. 16, 2006

(65) Prior Publication Data

US 2008/0155535 A1   Jun. 26, 2008

(51) Int. Cl.
    G06F 9/455    (2006.01)
(52) U.S. Cl. ................... 709/200; 709/220; 718/1
(58) Field of Classification Search ........... 709/200
    See application file for complete search history.

(56) References Cited

U.S. PATENT DOCUMENTS

| | | | |
|---|---|---|---|
| 2002/0069184 A1* | 6/2002 | Tilly et al. | 705/80 |
| 2003/0083756 A1* | 5/2003 | Hsiung et al. | 700/28 |
| 2004/0006571 A1* | 1/2004 | Anagol-Subbarao et al. | 707/104.1 |
| 2006/0090173 A1* | 4/2006 | Anderson et al. | 719/328 |
| 2006/0253214 A1* | 11/2006 | Gross | 700/97 |
| 2007/0162331 A1* | 7/2007 | Sullivan | 705/14 |
| 2007/0233581 A1* | 10/2007 | Peter | 705/27 |
| 2008/0077652 A1* | 3/2008 | Grant et al. | 709/203 |

FOREIGN PATENT DOCUMENTS

WO    WO 02/25437 A1 *  3/2002

OTHER PUBLICATIONS

Uchiya, T. et al. 2002. An architecture of active agent repository for dynamic networking. In Proceedings of the First international Joint Conference on Autonomous Agents and Multiagent Systems: Part 3 (Bologna, Italy, Jul. 15-19, 2002). AAMAS '02. ACM, New York, NY, 1266-1267.*

* cited by examiner

*Primary Examiner*—Wing F Chan
*Assistant Examiner*—Kostas Katsikis

(57) ABSTRACT

One embodiment in accordance with the invention is a method that can include generating a repository of computing system architecture designs. An offer can be generated to instantiate a host environment for an application, wherein the offer includes a plurality of options. A selection of an option of the offer can be received and utilized to identify a computing system architecture design of the repository. The computing system architecture design can be utilized to instantiate the host environment for the application.

9 Claims, 3 Drawing Sheets

112a

| System Design Identifier 202 | Private Model 204 | Public Model 206 |
|---|---|---|
| • • • | • • • | • • • |

| System Design Identifier 212 | Private Model 214 | Public Model 216 |
|---|---|---|

FIG. 2

INFRASTRUCTURE BY CONTRACT

BACKGROUND

It is desirable to design and create optimal host environments, such as data centers, for software application workloads. Unfortunately, the current industry leaves this task up to the customer, who may not be familiar with the complexities of such host environments. It is pointed out that vendors might provide some suggestions for a host environment, but in general, the customer is left to design the system architecture for each workload, build the system, tune it, fix it, and update it when needed. Even when a systems integrator performs these tasks the cost and risk largely remains with each customer.

A conventional attempt to solve this problem depends on involving experts directly in designing each system architecture, which is expensive and leaves the customer with the risk. Another conventional attempt involves experts designing reference architectures in white papers, diagrams, and bills of material that have to be interpreted by the customer, which can be suboptimal, inefficient, error prone, and leaves the customer with the risk. Yet another conventional attempt involves automation approaches that attempt to design the optimal system architecture for a given set of concerns dynamically, which has proven to be an intractable problem.

Therefore, it is desirable to address one or more of the above issues.

BRIEF DESCRIPTION OF THE DRAWINGS

FIG. 2 is a block diagram of an exemplary repository of computing system architecture designs in accordance with various embodiments of the invention.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
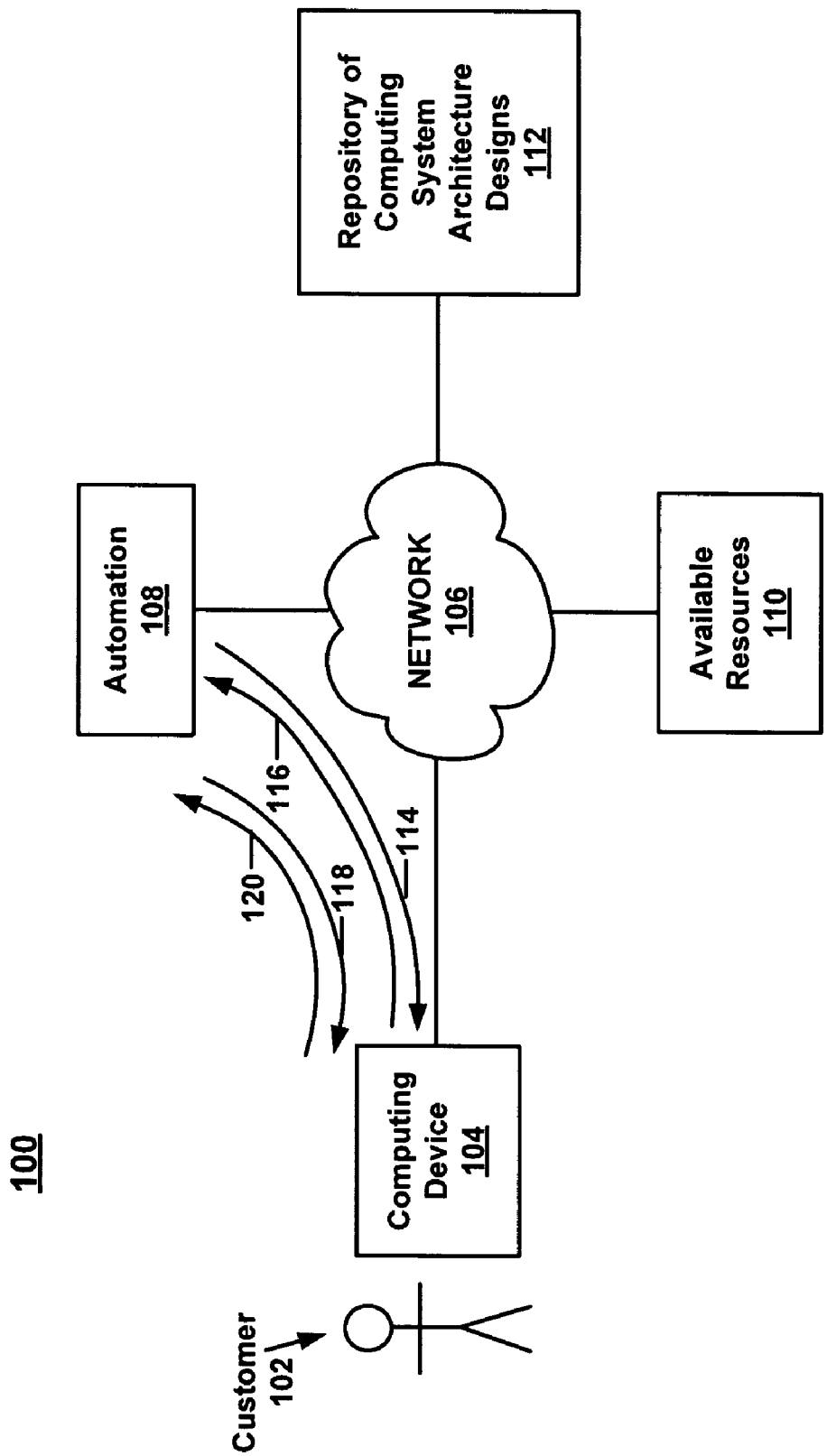
FIG. 1 is a block diagram of an exemplary system 100 for enabling the implementation of a computing infrastructure by contract in accordance with various embodiments of the invention.

FIG. 1 is a block diagram of an exemplary system 100 for enabling the implementation of a computing infrastructure by contract in accordance with various embodiments of the invention. System 100 enables customers (or users) 102 to focus on defining their goals and policies associated with one or more application workloads that operate on a computing infrastructure. Note that the computing infrastructure can include any number of data centers and/or computing infrastructure utilized by an enterprise, but is not limited to such. Additionally, the one or more application workloads can include, but is not limited to, enterprise applications, client/server applications, multi-tier applications, large and complex software configurations, and the like. It is pointed out that one or more system domain experts can capture and create the key computing system architecture choice points for customers 102, which can be represented by a repository of computing system architecture designs 112. As such, the repository of system architecture designs 112 can be utilized to fulfill the varying goals and policies of the customers 102. Furthermore, based on input from user 102, automation technology 108 can select and instantiate a host computing system architecture that best satisfies the desires of customer 102.

It is understood that customer (or user) 102 can be a service consumer while the automation 108, network 106, available resources 110, and the repository of computing system architecture designs 112 of system 100 can be part of a service provider, such as, an external provider of services or an IT (Information Technology) function within a business. Note that the user 102 can be associated with the service provider (e.g., an employee of it) or the user 102 could be unassociated with the service provider (e.g., a customer of it).

Within system 100, the repository of computing system architecture designs 112 can include any number of computing system architecture designs for any particular application workload (e.g., email application), wherein each computing system architecture design can be a data model that describes a deployed environment. Note that each architecture design of the repository 112 can be distinguished by particular characteristics such as, but not limited to, cost, capacity, performance, qualities of service, security, and lifecycle. The computing system architecture designs of repository 112 can be expressed in a programmatically accessible declarative notation, e.g., XML (eXtensible Markup Language), but is not limited to such. Furthermore, it is appreciated that the repository of computing system architecture designs 112 can be implemented in a wide variety of ways.

For example, FIG. 2 is a block diagram of an exemplary repository of computing system architecture designs 112a in accordance with various embodiments of the invention. Specifically, each computing system architecture design included (or stored) with the repository 112a can include a corresponding system design identifier (e.g., 202), a private model (e.g., 204), and a public model (e.g., 206). Note that since the public model 206 can be relevant to customer 102, it may be shown to customer 102 while the private model 204 is not usually shown to the customer 102 and can be relevant to automation 108. More specifically, the private model 204 can include the actual specification of the computing system architecture design to be deployed that is associated with system identifier 202, such as but not limited to, the particular kinds of resources, equipment, hardware, software manifest, along with the configuration and topology of such. Additionally, the corresponding public model 206 can include characteristics or functionalities associated with the specification of the private model 204, such as, one or more descriptions related to cost, capability, performance, capacity, qualities of service, security, function, lifecycle, and any other qualities, but not limited to such.

For example, if system architecture design identifier 202 was for an infrastructure design for hosting an electronic mail (email) system, its corresponding public model 206 could include a description highlighting the increased data retention capability of design 202 while its corresponding private model 204 can recite its specific tiered storage design, which could include inexpensive spindles for storing data that is not frequently accessed. It is understood that the repository of computing system architecture designs 112a can include multiple different computing system architecture designs (e.g., 202 and 212) for hosting an electronic mail (email) system that could be presented to and selected by customer 102 with each presumably highlighting its cost vs. feature benefits. It is appreciated that within repository 112a, computing system architecture design identifier 212 can include a corresponding private model 214 and a corresponding public model 216. As such, the system design identifier 212, private model 214, and public model 216 function in a manner similar to the system design identifier 202, private model 204, and public model 206, respectively, as described herein.

Within FIG. 2, it is appreciated that the repository 112a can include one or more computing system architecture designs for each application workload, and, the repository 112a can include one or more different application workloads. It is understood that the computing system architecture designs of repository 112a and their associated characteristics can be expressed in a programmatically accessible declarative notation (e.g., XML), but is not limited to such. Additionally, it is noted that the potential services included by the repository 112a (or repository 112) can be categorized. In various embodiments, the potential services included by the repository 112a (or repository 112) can be separated into one or more different categories of service or services.

Within FIG. 1, it is pointed out that the automation 108 can transmit a catalog 114 of potential services associated with repository 112 to computing device 104 via network 106, thereby enabling customer 102 to browse the catalog 114. In one embodiment, the catalog 114 can enable the customer 102 to select to see all services currently available, or, a particular category of services. For example, the customer 102 can utilize computing device 104 in order to select a particular category of services within catalog 114 that he or she is interested in. As such, the computing device 104 can transmit that selection (or request) 116 to automation 108 via network 106. Upon receipt of request 116, the automation 108 can generate an offer to instantiate one or more host environments for one or more requested application workloads for customer 102, wherein each host environment can include some options. The automation 108 can generate the offer in a wide variety of ways. For example in various embodiments, the automation 108 can generate the offer by selecting from the repository of computing system architecture designs 112 any alternative architecture designs available for each particular requested application workload. Additionally, as part of generating the offer, the automation 108 can eliminate from the list of one or more potential system architecture designs any designs that the requesting user 102 is not authorized to use, or that involve resources that are currently unavailable. Furthermore, as part of generating the offer, the automation 108 can utilize the list of one or more potential system architecture designs in order to retrieve their associated characteristics (e.g., public model 206) that can be included as part of the offer. The automation 108 can then transmit the offer 118 to the customer 102 via network 106 for reception by computing device 104.

Upon receipt of offer 118 via computing device 104, the user 102 can utilize computing device 104 to select from the options offered in offer 118 whichever characteristics best align with his or her particular goals, constraints, and policies related to one or more application workloads. It is appreciated that as the customer 102 makes selections within offer 118, the automation 108 enables customer 102 to understand the implications of each decision in terms of, for example, the cost and/or time it would take to deliver that service. Once completed, the user 102 can cause computing device 104 to submit or transmit the resulting proposed contract 120 to the automated process 108 via network 106.

Upon reception of the proposed contract 120 from computing device 104, the automation 108 can perform an approval process associated with the proposed contract 120 prior to fulfillment. Note that the approval process can include, but is not limited to, credit authorization of customer 102, determining if all the resources for instantiation are currently available, determining if the customer (or user) 102 has the proper authority to submit the proposed contract 120, enabling the boss of customer 102 to approve of the proposed contract 120, determining whether to fulfill the proposed contract 120 based on the role and/or identity of customer (or user) 102, and the like. If the proposed contract 120 is not approved, the automation 108 can notify the customer (or user) 102 of that rejection, for example, via email, text message, audio message, and the like. However, if the proposed contract 120 is approved, the automated process 108 can select or identify from the computing system architecture repository 112 via network 106 the appropriate system architecture description (e.g., private model 204) based on the user's proposed contract 120.

Within FIG. 1, the automated process 108 can then utilize the system architecture description (e.g., private model 204) to select and configure the appropriate resources of the available resources 110 via network 106 and instantiate the host system for the requested one or more target application workloads. As part of the instantiation, the automation 108 can utilize virtualization technology so that preexisting hardware configurations can be configured appropriately. Furthermore, the automated process 108 can also instantiate and configure the one or more target applications within the host system (or environment) via network 106. Moreover, the automated process 108 can configure monitoring and control technology via network 106 to assure that the resulting host system satisfies the contractual terms of the proposed contract 120 specified by the user 102. It is noted that the monitoring and control technology can either modify the host system to stay in conformance or notify the user 102 when conformance is not possible (e.g., by email via network 106). In this manner, system 100 can enable the implementation of a computing infrastructure by contract in accordance with various embodiments of the invention. It is also noted that the specifications for configuring monitoring and control technology may be provided in the private model for the associated system design stored in the repository 112.

It is understood that system 100 separates responsibilities, so customers 102, experts, and the supporting automation 108 can address concerns and execute appropriate processes. The user 102 can focus on goals and constraints; experts can focus on defining system architecture options of repository 112 and how they are differentiated, and automation technology 108 can provide the user 102 with the constrained set of options (e.g., offer 118) it can actually support rather than an open-ended set of options, most of which cannot be satisfied by automation 108.

System 100 can include computing device 104, network 106, automation 108, available resources 110, repository of computing system architecture designs 112, and one or more customers (or users) 102. It is understood that computing device 104 can be implemented in a wide variety of ways. For example in various embodiments, the computing device 104 can include, but is not limited to, a computer system, a mainframe computer system, a portable computing device, a laptop computer, a distributed computer system, and the like. Furthermore, it is appreciated that network 106 can be implemented in a wide variety of ways. For example in various embodiments, network 106 can include, but is not limited to, one or more communication protocols, one or more communication networks, wired and/or wireless communication technologies, one or more local area networks (LANs), one or more metropolitan area networks (MANs), one or more wide area networks (WANs), one or more intranets, the Internet, or any combination thereof. Additionally, it is noted that the repository of computing system architecture designs 112 can be implemented in a wide variety of ways. For example in various embodiments, the repository of computing system architecture designs 112 can include, but is not limited to, volatile memory, non-volatile memory, mass data storage, one or more databases, one or more disk arrays, any type of data storage device or apparatus, or any combination thereof.

Within FIG. 1, the automation 108 can be implemented in a wide variety of ways. For example in various embodiments, the automation 108 can be implemented by using, but is not limited to, software, firmware, electronic hardware, electronic circuitry, hardware state machine, human-involved action(s), or any combination thereof. The available resources 110 can be implemented in a wide variety of ways. For example in various embodiments, the available resources 110 can include, but is not limited to, any number of data centers, any computing infrastructure utilized by an enterprise, computing resources, one or more servers, storage, one or more networks, one or more software configurations, one or more operating systems, one or more middleware applications, one or more business logic, or any combination thereof. Moreover, the available resources 110 can include, but is not limited to, the combination of existing computing system architecture resources that are not otherwise assigned to an entity, or alternatively, the combination of existing computing system architecture resources that are not otherwise assigned to an entity and are desirable to assign to customer 102 based on his or her defined identity or job position. It is understood that system 100 can be implemented to include greater or fewer elements than those shown in FIG. 1.

Within system 100, computing device 104, automation 108, available resources 110 and repository of computing system architecture designs 112 can each be coupled to network 106 via wired and/or wireless communication technologies. It is appreciated that the elements of system 100 can be coupled in different ways than those shown within FIG. 1 in accordance with various embodiments.

Figure 3:
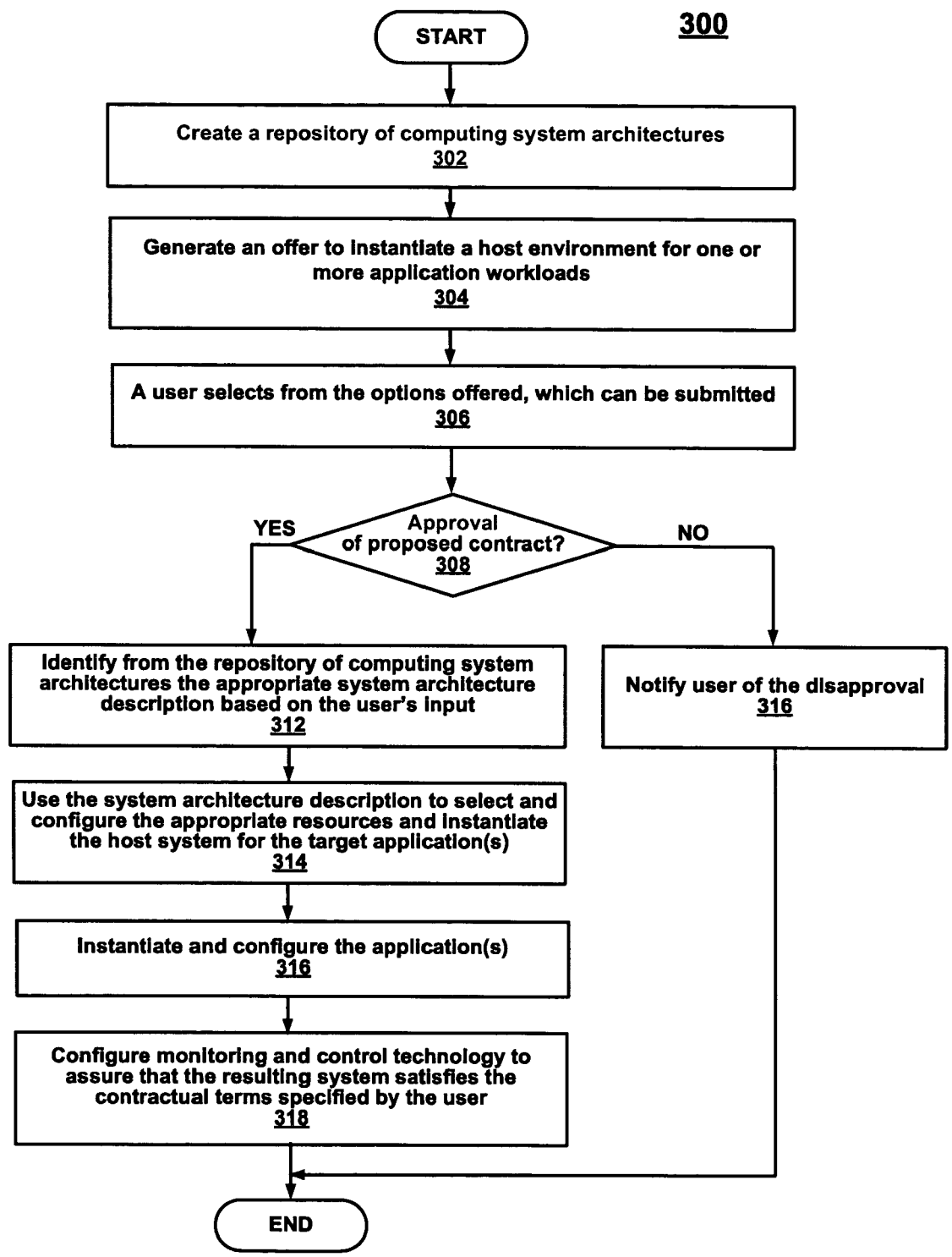
FIG. 3 is a flow diagram of an exemplary method in accordance with various embodiments of the invention for enabling the implementation of a computing infrastructure by contract.

FIG. 3 is a flow diagram of an exemplary method 300 in accordance with various embodiments of the invention for enabling the implementation of a computing infrastructure by contract. Method 300 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 300, such operations are exemplary. Method 300 may not include all of the operations illustrated by FIG. 3. Also, method 300 may include various other operations and/or variations of the operations shown by FIG. 3. Likewise, the sequence of the operations of method 300 can be modified. It is noted that the operations of method 300 can be performed manually, by software, by firmware, by electronic hardware, or by any combination thereof.

Specifically, method 300 can include creating or generating or reusing a repository of computing system architecture designs. An offer can be generated to instantiate a host environment for one or more application workloads. A selection can be made by a user from the options offered thereby creating a proposed contract, which can then subsequently be transmitted or submitted to automation. A determination can be made as to whether the proposed contract should be approved. If not, the user can be notified that the proposed contract has not been approved. However, if the proposed contract is approved, an identification can be made of the appropriate computing system architecture description from the repository of computing system architecture designs based on the user's input. The computing system architecture description can be utilized to select and configure the appropriate resources and instantiate the host system for the one or more target applications. The one or more target application workloads can be instantiated and configured to operate within the instantiated host system. Monitoring and control technology can be configured to assure that the resulting system satisfies the contractual terms specified by the user.

At operation 302 of FIG. 3, a repository of computing system architecture designs (e.g., 112) can be created or generated or reused. It is appreciated that operation 302 can be implemented in a wide variety of ways. For example in various embodiments, the generation or creation of the repository of computing system architecture designs at operation 302 can be implemented in any manner similar to that described herein, but is not limited to such.

At operation 304, an offer (e.g., 118) can be generated to instantiate a host environment for one or more application workloads. It is understood that operation 304 can be implemented in a wide variety of ways. For example in various embodiments, the generation of the offer to instantiate a host environment for one or more application workloads at operation 304 can be implemented in any manner similar to that described herein, but is not limited to such.

At operation 306 of FIG. 3, one or more selections can be made by a user from the options offered thereby creating a proposed contract (e.g., 120), which can subsequently be submitted or transmitted to automation (e.g., 108). It is noted that operation 306 can be implemented in a wide variety of ways. For example in various embodiments, operation 306 can be implemented in any manner similar to that described herein, but is not limited to such.

At operation 308, a determination can be made as to whether the proposed contract (e.g., 120) should be approved. If the proposed contract is approved at operation 308, process 300 can proceed to operation 312. However, if the proposed contract is not approved at operation 308, process 300 can proceed to operation 310. It is appreciated that operation 308 can be implemented in a wide variety of ways. For example in various embodiments, operation 308 can be implemented in any manner similar to that described herein, but is not limited to such.

At operation 310 of FIG. 3, the user can be notified that the proposed contract (e.g., 120) has not been approved or rejected. It is understood that operation 310 can be implemented in a wide variety of ways. For example in various embodiments, at operation 310 the user can be notified via email, text message, and/or audio message that the proposed contract has not been approved. It is pointed out that operation 310 can be implemented in any manner similar to that described herein, but is not limited to such. At the completion of operation 310, process 300 can be ended.

At operation 312, an identification can be made of the appropriate computing system architecture description (e.g., private model 204) from the repository of computing system architecture designs (e.g., 112) based on the user's proposed contract (e.g., 120). It is noted that operation 312 can be implemented in a wide variety of ways. For example in various embodiments, operation 312 can be implemented in any manner similar to that described herein, but is not limited to such.

At operation 314 of FIG. 3, the system architecture description (e.g., private model 204) can be utilized to select and configure the appropriate resources and instantiate the host system for the one or more target applications. It is appreciated that operation 314 can be implemented in a wide variety of ways. For example in various embodiments, operation 314 can be implemented in any manner similar to that described herein, but is not limited to such.

At operation 316, the one or more target application workloads can be instantiated and configured to operate within the instantiated host system or environment. It is appreciated that operation 316 can be implemented in a wide variety of ways. For example in various embodiments, operation 316 can be implemented in any manner similar to that described herein, but is not limited to such.

At operation 318 of FIG. 3, monitoring and control technology can be configured to assure that the resulting system satisfies the contractual terms specified by the user. It is appreciated that operation 318 can be implemented in a wide variety of ways. For example in various embodiments, the monitoring and control technology can either modify the host system to stay in conformance or notify the user when conformance is not possible (e.g., via email, text message, audio message, or the like). Further, in some embodiments, specific monitoring and control technologies can be specified as part of the private model (e.g., 204) of the system design. It is pointed out that operation 318 can be implemented in any manner similar to that described herein, but is not limited to such. At the completion of operation 318, process 300 can be ended.

Note that various embodiments of the invention separate responsibilities, so customers, experts, and the supporting automation can address concerns and execute appropriate processes. The user can focus on goals and constraints; experts can focus on defining system architecture options of a repository and how they are differentiated, and automation technology can provide the user with the constrained set of options it can actually support rather than an open-ended set of options, most of which cannot be satisfied by the automation.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method comprising:
transmitting to a computing device via a network a catalog of potential services associated with a repository of computing system architecture designs, said transmitting performed by an automation, each computing system architecture design of said repository including a corresponding system design identifier, and a private model and a corresponding public model, said public model relevant to a customer and said private model used for said automation, wherein said private model includes a specification of said computing system architecture design to be deployed that is associated with said system design identifier, and said repository of computing system architecture design, said corresponding public model including characteristics or functionalities associated with said specification of said private model;
receiving a category selection at said computing device of a category of said potential services within said catalog, wherein said category selection is transmitted to said automation by said computing device via said network;
upon receipt of said category selection by said automation, generating an offer to instantiate a host environment for an application, said offer includes a plurality of options, said generating performed by said automation;
transmitting said offer to said computing device via said network, said transmitting performed by said automation;
receiving at said automation a selection of an option of said offer by a first user, wherein said selection of said option of said offer is a proposed contract, said proposed contract not being negotiable with a second user;
utilizing said selection of said option to identify a computing system architecture design of said repository, said utilizing said selection performed by said automation; and
utilizing said computing system architecture design to select and configure resources and instantiate said host environment for said application, said utilizing said computing system architecture design performed by said automation;
wherein said resources are selected from a group consisting of a data center, a computing infrastructure utilized by an enterprise, a computing resource, a server, storage, a network, a software configuration, an operating system, a middleware application, and business logic.

2. The method of claim 1, further comprising:
determining whether to approve said proposed contract.

3. The method of claim 1, further comprising:
instantiating and configuring said application to operate within said instantiated host environment.

4. A non-transitory computer-usable medium having application instructions stored thereon, wherein the application instructions when executed effect a method comprising:
transmitting to a computing device via a network a catalog of potential services associated with a repository of computing system architecture designs, said transmitting performed by an automation, each computing system architecture design of said repository including a corresponding system design identifier, and a private model and a corresponding public model, said public model relevant to a customer and said private model used for said automation, wherein said private model includes a specification of said computing system architecture design to be deployed that is associated with said system design identifier, and said repository of computing system architecture design, said corresponding public model including characteristics or functionalities associated with said specification of said private model;
receiving a category selection at said computing device of a category of said potential services within said catalog, wherein said category selection is transmitted to said automation by said computing device via said network;
upon receipt of said category selection at said automation, generating an offer to instantiate a host environment for an application, said offer includes a plurality of options, said generating performed by said automation;

receiving at said automation a selection of an option of said offer by a first user, wherein said selection of said option of said offer is a proposed contract, said proposed contract not being negotiable with a second user;

utilizing said selection of said option to identify a computing system architecture design of said repository of computing system architecture designs, said utilizing said selection performed by said automation; and utilizing said computing system architecture design to select and configure resources and instantiate said host environment for said application, said utilizing said computing system architecture design performed by said automation;

wherein said resources are selected from a group consisting of a data center, a computing infrastructure utilized by an enterprise, a computing resource, a server, storage, a network, a software configuration, an operating system, a middleware application, and business logic.

5. The application instructions of claim 4, further comprising:

determining whether to approve said proposed contract.

6. The application instructions of claim 4, further comprising:

instantiating and configuring said application to operate within said instantiated host environment.

7. A method comprising:

transmitting to a computing device via a network a catalog of potential services associated with a repository of computing system architecture designs, said transmitting performed by an automation, each computing system architecture design of said repository including a corresponding system design identifier, and a private model and a corresponding public model, said public model relevant to a customer and said private model used for said automation, wherein said private model includes a specification of said computing system architecture design to be deployed that is associated with said system design identifier, and said repository of computing system architecture design, said corresponding public model including characteristics or functionalities associated with said specification of said private model;

receiving a category selection at said computing device of a category of said potential services within said catalog, wherein said category selection is transmitted to said automation by said computing device via said network;

upon receipt of said category selection by said automation, generating an offer to instantiate a host environment for an application, said offer includes a plurality of options, said generating performed by said automation;

receiving at said automation a selection of an option of said offer by a first user, wherein said selection of said option is a proposed contract, said proposed contract not being negotiable with a second user;

utilizing said selection of said option to identify a computing system architecture design of said repository, said utilizing said selection performed by said automation; and utilizing said computing system architecture design to select and configure resources and instantiate said host environment for said application, said utilizing said computing system architecture design performed by said automation;

wherein said resources are selected from a group consisting of a data center, a computing infrastructure utilized by an enterprise, a computing resource, a server, storage, a network, a software configuration, an operating system, a middleware application, and business logic.

8. The method of claim 7, further comprising:

determining whether to approve said proposed contract.

9. The method of claim 8, wherein said utilizing said selection and utilizing said computing system architecture design are performed if said proposed contract is approved.

* * * * *